(12) United States Patent
Ghanbari et al.

(10) Patent No.: US 7,760,801 B2
(45) Date of Patent: Jul. 20, 2010

(54) TRANSMISSION OF VIDEO

(75) Inventors: Mohammed Ghanbari, Colchester (GB); Kai Sun, Colchester (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1468 days.

(21) Appl. No.: 10/534,468

(22) PCT Filed: Nov. 18, 2003

(86) PCT No.: PCT/GB03/04996

§ 371 (c)(1),
(2), (4) Date: May 11, 2005

(87) PCT Pub. No.: WO2004/047455

PCT Pub. Date: Jun. 3, 2004

(65) Prior Publication Data

US 2006/0045180 A1    Mar. 2, 2006

(30) Foreign Application Priority Data

Nov. 18, 2002 (GB) ................................. 0226872.0
Sep. 29, 2003 (GB) ................................. 0322767.5

(51) Int. Cl.
*H04N 11/04* (2006.01)
*H04B 1/66* (2006.01)
(52) U.S. Cl. .............................. 375/240.03; 375/240.12
(58) Field of Classification Search .............. 348/390, 348/395, 396, 394, 404, 405, 409, 12, 13, 348/19, 607, 391; 375/240.03, 240.12, 240.01, 375/240.02, 240.25, 240.05, 240.19
See application file for complete search history.

(56) References Cited

U.S. PATENT DOCUMENTS

| | | | | |
|---|---|---|---|---|
| 5,612,900 A | * | 3/1997 | Azadegan et al. | 709/247 |
| 5,991,811 A | * | 11/1999 | Ueno et al. | 709/231 |
| 6,002,440 A | | 12/1999 | Dalby et al. | |
| 6,522,693 B1 | * | 2/2003 | Lu et al. | 375/240.02 |

(Continued)

FOREIGN PATENT DOCUMENTS

WO     WO 98/26604     6/1998

OTHER PUBLICATIONS

Furini et al., "Real-Time Traffic Transmissions over the Internet", IEE Transactions on Multimedia, vol. 3, No. 1, Mar. 2001, pp. 33-40,XP002273256.

(Continued)

*Primary Examiner*—Behrooz Senfi
(74) *Attorney, Agent, or Firm*—Nixon & Vanderhye P.C.

(57) ABSTRACT

Compressed recorded video is to be transmitted over a variable bit-rate link, using bandwidth reservation. In order to determining the transmission rate that is to be used (and reserved) at any given time, in such a way as to make the two match so as to minimize wasted bandwidth, the data stream is split into chunks chosen such that the average bit rate for the chunk as a whole is no less that the average bit rate for any shorter chunk starting at the same point. The chunk can then be transmitted using this average rate without any buffering problems. Preferably one chooses chunks so that the average bit rate for the chunk is no less than that for any shorter or longer chunk starting at the same point. This has the benefit that a request for bandwidth never has to ask for an allocation that is higher than that specified in any previous such request. In systems that switch between streams of different degrees compression. the switching points can with advantage be chosen to coincide with the inter-chunk boundaries.

21 Claims, 14 Drawing Sheets

U.S. PATENT DOCUMENTS

| | | | |
|---|---|---|---|
| 6,937,770 B1* | 8/2005 | Oguz et al. | 382/235 |
| 2001/0025308 A1* | 9/2001 | Jinushi et al. | 709/219 |
| 2002/0090027 A1* | 7/2002 | Karczewicz et al. | 375/240.01 |

OTHER PUBLICATIONS

Chang et al., "Dynamic Window-based Traffic-Smoothing for Optimal Delivery of Online VBR Media Streams", Parallel and Distributed Systems, 2000, Los Alamitos, CA, USA, IEEE Comput.Soc. US, Jul. 4, 2000, pp. 127-134, XP0101504391.

Assuncao et al., "Transcoding of Single-Layer MPEG Video Into Lower Rates", IEE Proceedings;Vision, Image and Signal Processing, Institution of Electrical Engineers, GB, vol. 144, No. 6, Dec. 19, 1997, pp. 377-383, XP006009073.

Karczewica et al:, "The SP- and SI-Frames Design for H.264/AVC", IEEE Transactions on Circuits and Systems for Video Technology, IEEE Inc., New York, US, vol. 13, No. 7, Jul. 2003, pp. 637-644, XP001051192.

Braden et al, "Resource ReSerVation Protocol (RSVP)", in RFC-2205, Sep. 1997.

Ng, "A Reserved Bandwidth Video Smoothing Algorithm for MPEG Transmission", The Journal of Systems and Software 48 (1999(, pp. 233-245.

Furini et al., "Real-Time Traffic Transmissions Over the Internet", IEEE Transactions on Multimedia, vol. 3, No. 1, Mar. 2001.

Salehi et al., "Supporting Stored Video: Reducing Rate Variability and End-to-End Resource Requirements through Optimal Smoothing", Technical Report: UM-CS-1995-098. University of Massachusetts 1995.

International Search Report.

Karczewicz et al. "A Proposal for SP-Frames", document VCEG-L-27, ITU-T Video Coding Experts Group Meeting, Eibsee, Germany, Jan. 9-12, 2001.

Karczewicz et al, "SP-Frame Demonstrations", document VCEG-N42, ITU-T Video Coding Experts Group Meeting, Santa Barbara, CA, USA, Sep. 24-27, 2001.

Dapeng Wu et al, "Streaming Video Over Internet: Approaches and Directions", IEEE Transactions on Circuits and Systems for Video Technology, vol. 11, No. 3, Mar. 2001.

Conklin et al., "Video Coding for Streaming Media Delivery on the Internet", IEEE Transactions on Circuits and Systems for Video Technology, vol. 11, No. 3, Mar. 2001.

Jammeh et al., "Transporting Real Time Transcoded Video over Internet Using End to End Control", PV2002, Apr. 2002.

Cai et al., "Rate-Reduction Transcoding Design for Video Streaming Applications", PV 2002, Apr. 2002.

Rejaie et al, "Layered Quality Adaptation for Internet Video Streaming", IEEE Journal on Selected Areas in Communications, vol. 18, No. 12, Dec. 2000.

Feamster et al, "On the Interaction Between Layered Quality Adaptation and Congestion Control for Streaming Video", PV2001, Apr. 2001.

Licandro et al, A Rate/Quality Controlled MPEG Video Transmission System in a TCP-Friendly Internet Scenario, PV 2002, Apr. 2002.

http://www.ietf.org/html.charters/wg-dir.html#TransportArea.
http://www.ietf.org/html.charters/diffserv-charter.html.
http://www.ietf.org/html.charters/mpls-charter.html.
http://www.ietf.org/html.charters/rsvp-charter.html.
http://www.ietf.org/html.charters/intserv-charter.html.

Blake et al., "An Architecture for Differentiated Services", in RFC-2475, Dec. 1998.

Braden et al, "Integrated Service in Internet Architecture: An Overview", in RFC-1633, Jun. 1994.

Mitzel et al, "A Study of Reservation Dynamics in Integrated Services Packet Networks", in Proceedings of the Conference on Computer Communications (IEEE INFOCOM 1996), p. 871-879, Mar. 1996.

Foster et al., "A Quality of Service Architecture that Combines Resource Reservation and Application Adaptation", IWQOS2000, Jun. 2000.

Lu et al., "Understanding Video Qaulity and its Use in Feedback Control", PV 2002, Pittsburgh, Pennsylvania, USA, Apr. 24-26, 2002.

Yang et al., "Rate Control for VBR Video over ATM: Simplification and Implementation", IEEE Transactions on Circuits and Systems for Video Technology, vol. 11, No. 9, Sep. 2001.

Reed et al., "Constrained Bit-Rate control for Very Low Bit-Rate Streaming-Video Applications", IEEE Transaction on Circuits and Systems for Video Technology, vol. 11, No. 7, Jul. 2001.

* cited by examiner

TRANSMISSION OF VIDEO

This application is the US national phase of international application PCT/GB2003/004996 filed 18 Nov. 2003 which designated the U.S. and claims benefit of GB0226872.0 and GB 0322767.5, dated 18 Nov. 2002 and 29 Sep. 2003, respectively, the entire content of each of which is hereby incorporated by reference.

BACKGROUND

1. Technical Field of Present Example Embodiments

The present invention is concerned with the transmission of digitally coded video signals, for example over a telecommunications network, and, more particularly, video signals which have been encoded using a compression algorithm.

2. Description of Related Art

The rationale of compression algorithms is to exploit the inherent redundancy of the original video signal so as to reduce the number of bits that require to be transmitted. Many such algorithms are defined in international standards such as the ITU H.263 and the ISO MPEG standards. A useful review of these is given in Ghanbari, M., *Video Coding, an introduction to standard codecs*, IEE, London, 1999.

The degree of redundancy naturally varies with the picture content, and consequently the compression efficiency does too, resulting in a varying number of coded bits per frame. One option is to transmit the bits as they are generated, as in so-called variable bit rate (VBR) systems in which the transmitted bit rate varies considerably with time. Another option—constant bit rate (CBR) systems—is to employ a buffer at both the transmitter and receiver, to smooth out these fluctuations, and transmit from the transmit buffer to the receive buffer at a constant rate. CBR systems utilise a feedback mechanism to vary the rate at which data are generated (for example by adjusting the coarseness of quantisation used, or frame dropping), to prevent buffer overflow. The use of buffering necessarily involves the introduction of delay, increasing the latency of start (LOS)—i.e. the user has to wait while the receive buffer is filled to the necessary level before decoding and display of the pictures can commence. The feedback mechanism involves reduction in picture quality.

It has also been proposed to employ a degree of buffering to reduce, yet not totally eliminate, bit-rate variations (see, for example, Furini, M. and Towsley, D. F., "Real-Time Traffic transmissions over the Internet", *IEEE Transactions on Multimedia*, Vol. 3, No. 1, March 2001).

A major consideration when transmitting over a telecommunications network, and in particular packet networks such as the internet, is the effect of network congestion, where packet loss and unpredictable delays can cause problems. This has given rise to proposals for reservation systems, where a transmitter can request the network to allocate a specified guaranteed bit rate for its transmissions for a period of time. One such system, called "RSVP" is described in the Internet Engineering Task Force (IETF) document RFC 2205. However, other systems such as Expedited Forwarding of Differentiated Service, or CR-LDP may also be used.

In the case of a live video feed, the future characteristics of the bitstream being coded are unknown; with recorded material, however, they are. The fact that reservation systems allow the amount of the reserved bit-rate to be changed offers the opportunity to decide on a policy of how much network capacity to reserve at any time, based on knowledge of the coded material. A simple approach is to calculate the peak (VBR, unbuffered) bit-rate and request this for the entire duration of the transmission, but this is wasteful of network capacity and of course the higher the capacity requested, the greater is the probability of the network being unable to provide it and hence of the reservation request being refused. Another simple approach, which minimises the bit-rate to be requested, is to calculate the average bit-rate of the whole transmission and request this; however this results in the need for a very large buffer at the receiver and, more importantly (given that large amounts of storage are today relatively cheap) a large LOS. A modification to the peak-rate approach is considered in the above-cited paper by Furini and Towsley. Their scheme involves identifying the point in the video sequence at which the peak rate reaches a maximum, and requesting this rate for the period of time up to that point. Then the maximum peak rate over the remainder of sequence is located, and this (lower) rate requested. This process continues in the same manner over the whole sequence. The paper also suggests that a degree of buffering might be applied, thereby reducing the effective peak rates before the reservation algorithm is applied. Although this system improves the efficiency of network use as compared with the single peak rate system, there is still much wasted (i.e. reserved but unused) network capacity, and of course the benefit is small if the maximum peak rate occurs towards the end of the sequence. It does however have the benefit that the amount of network capacity requested falls, and, specifically, a reservation request never asks for a bit-rate that exceeds that of the previous requests, thereby reducing the risk of the reservation request being refused.

BRIEF SUMMARY OF EXAMPLE EMBODIMENTS OF THE INVENTION

According to one aspect of the present invention there is provided a method of transmitting a digital sequence of video signals which have been encoded using a compression algorithm such that the number of coded bits per frame is not constant, comprising:

(a) dividing the sequence into segments, wherein the first segment is a portion at the beginning of the sequence which has an average number of coded bits per frame which is greater than or equal to the average number of coded bits per frame of any shorter such portion, and wherein each succeeding segment is a portion immediately following the preceding segment which has an average number of coded bits per frame which is greater than or equal to the average number of coded bits per frame of any shorter such portion;

(b) determining a bit rate for each segment;

(c) transmitting the signals at the determined bit rates.

In another aspect, the present invention provides a method of transmitting a digital sequence of video signals which have been encoded using a compression algorithm such that the number of coded bits per frame is not constant, wherein the source video had been coded into a first sequence and a second sequence having respective different compression rates, comprising:

(a) analysing at least one of the streams to divide it into segments;

(b) selecting a switching point in the vicinity of an inter-segment transition identified at step (a);

(c) if the first sequence was not analysed in step (a), analysing the first sequence to divide it into segments;

(d) determining a bit rate for the or each segment of the first sequence up to the switching point;

(e) transmitting the signal of the first sequence up to the switching point at the determined bit rate(s);

(f) analysing a modified sequence which includes the second sequence from the switching point onwards, to divide it into segments;

(g) determining a bit rate for segments of the modified sequence;

(h) transmitting the signals of the modified sequence at the determined bit rate(s);

wherein said analyses are each performed by dividing the relevant sequence into segments, wherein the first segment is a portion at the beginning of the sequence which has an average number of coded bits per frame which is greater than or equal to the average number of coded bits per frame of any shorter such portion, and wherein each succeeding segment is a portion immediately following the preceding segment which has an average number of coded bits per frame which is greater than or equal to the average number of coded bits per frame of any shorter such portion.

BRIEF DESCRIPTION OF THE DRAWINGS

Some embodiments of the invention will now be described, by way of example, with reference to the accompanying drawings, in which.

DETAILED DESCRIPTION OF EXAMPLE EMBODIMENTS

Figure 1A:
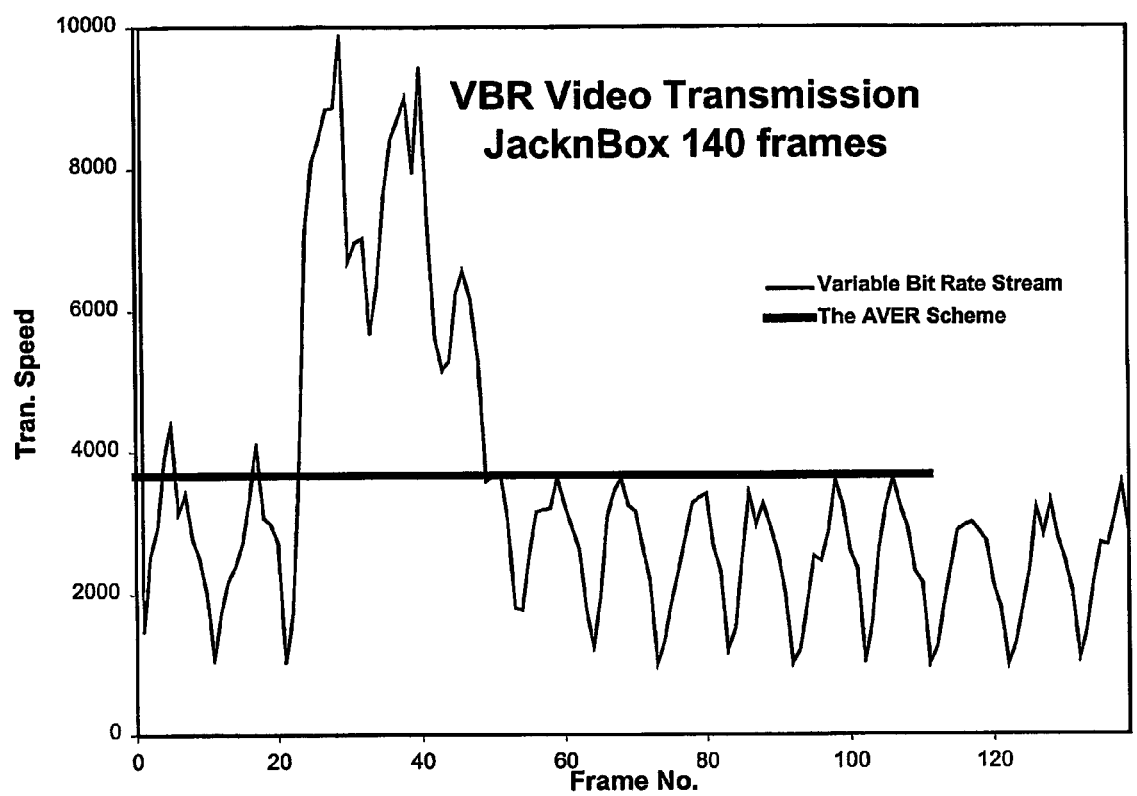
FIGS. 1A to 3C show graphically the results of tests carried out.

Consider, at a receiver, some arbitrary time segment (but equal to a whole number of frame periods), extending from time $t_g$ at which the receiver begins to decode frame g to time $t_h$ at which the receiver begins to decode frame h. The duration of this segment is h−g. Suppose, further, that the transmission rate during this segment is A bits/frame period.

Obviously, at time $t_g$, the receiver must have already received the bits for all frames up to and including frame g, i.e.

$$\sum_{j=0}^{g} d_j \text{ bits}$$

where $d_j$ is the number of coded bits generated by the encoder for frame j.

Suppose however that the receiver has, prior to time g, also received p additional bits, that is, in total, $$\sum_{j=0}^{g} d_j + p \text{ bits.}$$

At any time $t_k$ ($t_g \leq t_k \leq t_h$), at which the receiver begins to decode frame k, the receiver has also received (k−g)A bits, so:

Total bits received at time $$t_k = \sum_{j=0}^{g} d_j + p + (k-g)A.$$

At this point, the receiver needs to have all the bits for frames up to and including frame k, that is:

Total bits needed at time $$t_k = \sum_{j=0}^{k} d_j.$$

Since the number of bits received must be at least equal to the number needed, the condition that needs to be satisfied to avoid buffer underflow is $$\sum_{j=0}^{g} d_j + p + (k-g)A \geq \sum_{j=0}^{k} d_j$$

$$\text{Or } p + (k-g)A \geq \sum_{j=g+1}^{k} d_j$$

If this is to be achieved without the transmission of preload bits p, this requires that $$(k-g)A \geq \sum_{j=g+1}^{k} d_j$$

$$\text{Or, } A \geq \frac{1}{(k-g)} \sum_{j=g+1}^{k} d_j.$$

Thus, the transmitted rate A must be greater than or equal to the average generated bits per frame over frames g+1 to k, for any value of k (g+1≤k≤h), which will be achieved if $$A \geq = \max_{k=g+1}^{h} \left\{ \frac{1}{(k-g)} \sum_{j=g+1}^{k} d_j \right\}.$$

Use of this rate means that the number of bits (h−g)A transmitted during the segment will exceed the number of bits generated for the segment, unless the maximum occurs for k=h, that is, at the end of the segment. On the premise that the continued use of the transmission rate thus calculated, after the maximum has passed, seems to represent the use of a rate higher than absolutely necessary, the first version of the invention now to be described aims to partition the data to be transmitted into segments in such a manner that these maxima always occur at the end of segment.

The first method to be described is for the transmission of stored video material, already encoded using a compression algorithm such as MPEG, over a packet network such as the internet. It presupposes that the network has provision for reservation of bit-rate capacity. It aims to determine the bit-rate that is to be used as a function of time, in such a manner as to achieve:

small latency of start;
low transmitted bit-rate; and
high transmission efficiency (i.e. low wastage);

although since these are conflicting requirements, any solution must necessarily be a compromise.

In this example it is assumed that there is no constraint on the bit rate that may be chosen, and that the bit rate used for transmission and the bit rate reserved on the network are the same.

This first version also is subject to the constraint that the requested bit-rate can never increase—i.e. it is a monotonically decreasing function of time: as noted above, this is desirable in reducing the risk of reservation failure.

Since huge storage hardware is not a problem for current users, in this solution, reducing the required buffer size at the decoder is not of primary concern, though, in fact, the required buffer size resulting from this method is also greatly reduced compared with using the average bit rate to achieve VBR video transmission. Even in the worst case, rarely encountered in practice, the buffer size required would be no larger than required when transmitting a VBR video stream at the average bit rate.

The following algorithm determines a "function of transmission ("FOT") to be used.

We assume there are N frames in the video sequence, and the number of encoded bits for each frame is $d_0, d_1, \ldots d_{N-1}$, respectively As noted above, this algorithm is subject to the constraint that the function of transmission can never increase, but only decrease.

Conceptually, transmission rate changes can occur at any frame interval in the FOT. In practice, there may be a limit on how often the rate may be changed, depending on the constraints of the particular reservation system in use; however, with a monotonically decreasing FOT, a delay in rate change (although wasteful of network capacity), will not result in any loss of quality since its only effect is the reservation of more capacity than is actually needed. The first step of the algorithm is to find how many "steps" the FOT will have, and when each step occurs.

First, we define:

$$A_i = \frac{\sum_{j=0}^{i} d_j}{(i+1)}$$

which represents the average bit rate of the video sequence from the start up to and including frame i. Then, $A_0$, $A_1, \ldots A_{N-1}$ are calculated, and from these the value of i having the largest $A_i$. Suppose this value is $k_0$. The first "step" edge is defined as occurring at the end of frame $k_0$. It means that, until the end of frame $k_0$, FOT needs its highest transmission rate.

After finding the first "step", frame ($k_0$+1) is regarded as the "first" frame for the following frames and $A_{i+1}^{(1)}$ are calculated for i=$k_0$+1, $k_0$+2, . . . N-1. The formula for this is $$A_i^{(1)} = \frac{\sum_{j=k_0+1}^{i} d_j}{(i+k_0)}$$

or, in the general case, $$A_i^{(q)} = \frac{\sum_{j=k_{q-1}+1}^{i} d_j}{(i-k_{q-1})}$$

Again, the largest value is chosen as the second "step" edge, at the end of frame $k_1$, $k_1$ being the corresponding value of i. The above procedure is repeated until the last "step" edge at frame N-1 has been reached. In general this results in M values $k_m$, m=0, . . . M-1 (where $k_{M-1}$ is always equal to N-1) which may be regarded as dividing the video sequence into M-1 segments: segment 0 comprises frames 0 to $k_0$; other segments m each comprise frames $k_{m-1}$+1 to $k_m$.

The purpose of the second stage of the algorithm is to choose an appropriate transmission rate for the "level" of each "step". Now, theoretically, the lowest rate that can ensure that all needed bits will be delivered by the end of each "step" even without any preloaded bits is the average of the bit-rates of the frames making up the segment. A lower rate necessarily requires preloaded bits and consequently a higher LOS, whilst with higher rates, network capacity may be wasted. Also, higher rates must lead to more risk of failure to reserve resource.

There are M segments m=0, 1, . . . M-1. Also, we define:
$S_i$ is the sum of bits generated in Segment i—i.e.

$$\sum_{q=k_{t-1}+1}^{k_t} d_q;$$

$R_i$ is the transmission rate of FOT in Segment i; (note that $K_0=k_0+1$)
$K_i$ is the number of frames in Segment i—i.e. $k_i-k_{i-1}$;
In this case the required rates are simply the average rates $R_i=S_i/K_i$; i=1, 2, . . . M-1.

This method can also be used to calculate the rate $R_0$ for Segment 0, if we define $k_{-1}=-1$.

Note that, in MPEG video coding, the first frame is always an I frame and it generates more bits than P or B frames. So, often, our results show the first segment includes only one frame and the transmission rate $R_0$ is much larger than $R_1$. Since users easily can wait a few frames' interval to have a better chance of resource reservation success, we prefer to set $R_0=R_1$.

The Third Step: After we have determined the whole FOT, the required buffer size at the decoder can be determined.

We now describe a second, modified version which is subject to a constraint on the rates that may be chosen. For example the constraint may be that the rate must be an integer number of bits per frame, or more generally that the rate must be one of a number of discrete rates. In analysis we will use the quantisation operators defined as follows:

$Q^+(X)$ means the lowest permitted rate greater than or equal to X (also referred to as the "ceiling" rate);

$Q^-(X)$ means the highest permitted rate less than or equal to X (also referred to as the "floor" rate).

Two options will be discussed:
(a) rounding up to the ceiling rate: in this case the rate used can become higher than strictly necessary for a particular segment, which may offer the opportunity to use a lower rate for the following segment;
(b) rounding down to the floor rate: in this case the rate used can become lower than necessary for a particular segment, resulting in the need to use a higher rate for the preceding segment.

Consider first the ceiling option. We first define the ceiling value of the "height" of the first "step" in the original FOT as the "height" of the refined first "step" in our new FOT. It will be noticed that, in this way, after the first "step", more bits have been transmitted to the receiver than the sum of bits of frames belonging to the "first" step. Thus, when we refine the second "step", we should exclude the number of bit belonging to the following "step" but having been transmitted in the previous "step(s)" and recalculate the average rate of the second "step". If the ceiling value of the new average bit rate is not less than the ceiling value of the average rate of the old third "step", it is just defined it as the "height" of the refined second "step". Otherwise, we define the ceiling value of the average bit rate of the old third "step" as the "height" of the refined second "step". Follow this procedure until the "height" of the refined last "step" is fixed. Since it always takes the ceiling value of each "step", it is possible that the VBR video stream transmission is achieved a few frame intervals shorter than the duration of the video sequence. With simulating the transmission based on the new FOT, the lifetime duration of FOT can be exactly specified. Once the VBR video stream transmission is achieved, reserved network resource can be immediately released. Thus, the 100% bandwidth utilization is still guaranteed. With the "height" of the refined first "step", LOS can be precisely recalculated. Finally, through simulating the transmission procedure, the required buffer size to prevent overflow can be also fixed.

The procedure adopted is as follows. Division into segments proceeds as before.

As well as the quantities $S_i$, $R_i$, $K_i$, defined above, we also introduce $R^1_i$, a temporary value for the transmission rate in Segment i.

I. Calculate all the average rates $R^1_i = S_i/K_i$; $1=0, 1, \ldots M-1$.
II. Set the rate for Segment 0 as $R_0 = Q^+(R^1_0)$
(Note that if as discussed earlier it is desired to use a lower rate for the first Segment, then one may instead begin with Segment 1)
III. Set the rate for Segment 1 by subtracting, before quantisation, the extra bits sent during the previous Segment:

$$R_1 = Q^+\{R_1^1 - (R_0 - R_0^1)\}$$

or $= Q^+\{R_2^1\}$ whichever is the greater.

IV. For the remaining Segments i=2, ... M−1:

$$R_i = Q^+\{R_i^1 - (R_{i-1} - R_{i-1}^1)\}$$

or $= Q^+\{R_{i+1}^1\}$ whichever is the greater. Naturally the second alternative does not arise for i=M−1.

The third version to be described uses the "floor" rates. In this case, the processing must be performed in reverse order, starting from the last "step". This is necessary so that the bits which cannot be transmitted in a particular segment can be pre-transmitted in the previous Segments. The specific procedure first defines the floor value of the average bit rate of the last "step" as the new transmission rate of the refined last "step" in the new FOT. The number of bits which are needed by the refined last "step" but cannot be transmitted, can then be determined. The previous "step(s)" should guarantee such a number of extra bits transmitted before the new last "step" FOT starts. Thus, when we refine the penultimate "step", we must aim for it to carry the bits it needs itself, plus the extra number of bits needed by the last "step". So, a new average bit rate has to be re calculated for the second last "step". If the floor of the new average bit rate of the second last "step" is not bigger than the floor of the average rate of the third last "step" in original FOT, just define it as the "height" of the new second last "step". Otherwise, define the floor of the average bit rate of the old third last "step" as the "height" of the new second last "step". Following this procedure until the first "step", the refinement is achieved and the refined FOT is obtained. As in the ceiling case: with the number of the pre-fetched bits and the "height" of the refined first "step", LOS can be precisely recalculated; finally, through simulating the transmission procedure, the required buffer size to prevent overflow can be also fixed.

As before, there are M segments m=0, 1, ... M−1. Also, we define:

$S_i$ is the sum of bits generated in Segment i—i.e.

$$\sum_{q=k_{i-1}+1}^{k_i} d_q;$$

$R_i$ is the transmission rate of FOT in Segment i;
$K_i$ is the number of frames in Segment i—i.e. $k_i - k_{i-1}$;
$R^1_i$ is a temporary transmission rate we assume in Segment i.

I. Calculate all the average rates $R^1_i = S_i/K_i$; i=1, 2, ... M−1.
II. Set the transmission rate $R_{M-1}$ for Segment M−1 equal to the floor value of the average rate for this segment. That is $$R_{M-1} = Q^-\{R^1_{M-1}\}.$$

II. Compute the number of preloaded bits, $P_{M-1}$, that are needed to be present in the receiver buffer at the beginning of Segment M−1 to prevent underflow in Segment M−1.

$$P_{M-1} = (R^1_{M-1} - R_{M-1}) * K_{M-1}$$

III. The rate for the next segment can then be calculated as $$R_{M-2} = Q^-\{R^1_{M-1} + P_{M-1}\}$$

or $= Q^-\{R^1_{M-3}\}$ whichever is the lower.

with $$P_{M-2} = (R^1_{M-2} - R_{M-2}) * K_{M-2}$$

IV. This process is then repeated using the general formula, m=M−3, ... , 0:

$$R_m = Q^-\{R^1_m + P_{m+1}\}$$

or $= Q^-\{R^1_{m-1}\}$ whichever is the lower.

And $$P_m = R^1_m - R_m.$$

Again, if desired this iteration may be stopped at m=1 and $R_1$ used for Segment 0.

This process results in a value for $P_0$ which is a preload for the first Segment, and will need to be transmitted first. In fact, it is convenient to define a preload $b_0$ which includes all bits that are transmitted before the receiver starts decoding the first frame at t=0.

Assuming that $R_0$ is calculated as above, than $$b_0 = P_0 + R_0$$

If, however the rate $R_1$ is used for Segment 0, then only $(K_0-1)R_1$ bits can be transmitted between t=0 and the end of the segment and therefore the total preload is:

$$P_0 + K_0 R_0 - (K_0-1) R_1$$

The latency of start (LOS) is, assuming $R_1$ is used, $b_0/R_1$.

The question of buffer size will now be discussed. Certainly, with our FOT, we can get reasonable transmission rate and LOS. The network transmission efficiency can be almost 100%, and it requires a smaller buffer size than the directly using fixed average rate bandwidth. However, in some situations, it is still much bigger than it required by reserving the peak rate bandwidth. In the scheme of reserving the peak rate bandwidth, it is enough if the buffer size at the decoder is only as much as the number of bits spent on the most complicated frame. However, in our scheme, we do need a larger buffer than that. Although, compared with a constant average bit rate, our scheme can get a much smaller buffer size in most situations, it should be admitted that, in the worst situation, the buffer size required by our scheme is near the buffer size required by a constant average bit rate. Such a situation happens when the biggest $A_i$ appears in the last frames of the video sequence. In such a situation, our "down stairs" curve almost has only one "step". Thus, it would be not effective enough to minimise the buffer size through the "step" changes. Nevertheless, such a situation hardly appears because, the later the "peak bits" appears, the less effect on $A_i$. Unless, at the end of the sequence, quite a few exceptional complicated frames appear abnormally, it will never happen. No matter what situation happens, LOS will never be a problem with our scheme. We believe, currently, it should not be a problem for the user to have some hardware that has a little large storage. A small LOS and good network transmission efficiency should cause more concern by the users.

In addition, even if users cannot afford a large buffer size our scheme requires, a compromise may be taken between the transmission efficiency and required buffer size at the decoder. With such a compromise, the required buffer size can be further reduced as the users wish.

Incidentally, although our current algorithm description is only based on bits per frame as a basic unit, naturally, the unit can be defined as a GOP or certain number of pictures or packets together. No matter what unit we would like to define in this algorithm, the principle is general and should be in common.

We now describe some examples of coding test video sequences, using the "floor" method. In each case the values of the function of transmission f(t) (or $R_i$), the value of $b_0$, and a suggested rate for transmission of $b_0$ are given, (a) for the above algorithm (b) using the method of Furini and Towsley, and (c) using a single, average bit rate.

Example 1

"JacknBox"

(a) We have coded a test sequence (named Jacknbox) of common intermediate format (CIF), 140 frames in duration with a fixed quantiser of step size 16 using H.263+ and derived the FOT function with our algorithm.

f(t)=

| | |
|---|---|
| 5100 | $0 < t <= T_{48}$; |
| 3645 | $T_{48} < t <= T_{51}$; |
| 3058 | $T_{51} < t <= T_{52}$; |
| 2830 | $T_{52} < t <= T_{61}$; |
| 2682 | $T_{61} < t <= T_{70}$; |
| 2651 | $T_{70} < t <= T_{71}$; |
| 2464 | $T_{71} < t <= T_{90}$; |
| 2447 | $T_{90} < t <= T_{108}$; |
| 2321 | $T_{108} < t$. |

In this document, we define $T_i$ as the time when the decoder displays Frame i.

We define the measure unit of all measurement rates in this document as bits per frame interval.

$b_0$=39824 bits; suggested transmission rate for $b_0$: 5100 bits per frame interval (b) Using Furini and Towsley's method, we get f(t)=

| | |
|---|---|
| 9896 | $T_0 < t <= T_{29}$; |
| 9432 | $T_{29} < t <= T_{40}$; |
| 7272 | $T_{40} < t <= T_{41}$; |
| 6552 | $T_{41} < t <= T_{46}$; |
| 6184 | $T_{46} < t <= T_{47}$; |
| 5328 | $T_{47} < t <= T_{48}$; |
| 3696 | $T_{48} < t <= T_{51}$; |
| 3632 | $T_{51} < t <= T_{106}$; |
| 3552 | $T_{106} < t <= T_{138}$; |
| 2896 | $T_{138} < t$. |

$b_0$=39824 bits

In their transmission scheme, $b_0$ would be achieved by 39824 bits per frame interval.

(c) With a constant average bit rate, the function would be:
f(t)=3669.
$b_0$=108488 bits;
$b_0$ is achieved by 3669 bits per frame interval.

Figure 1B:
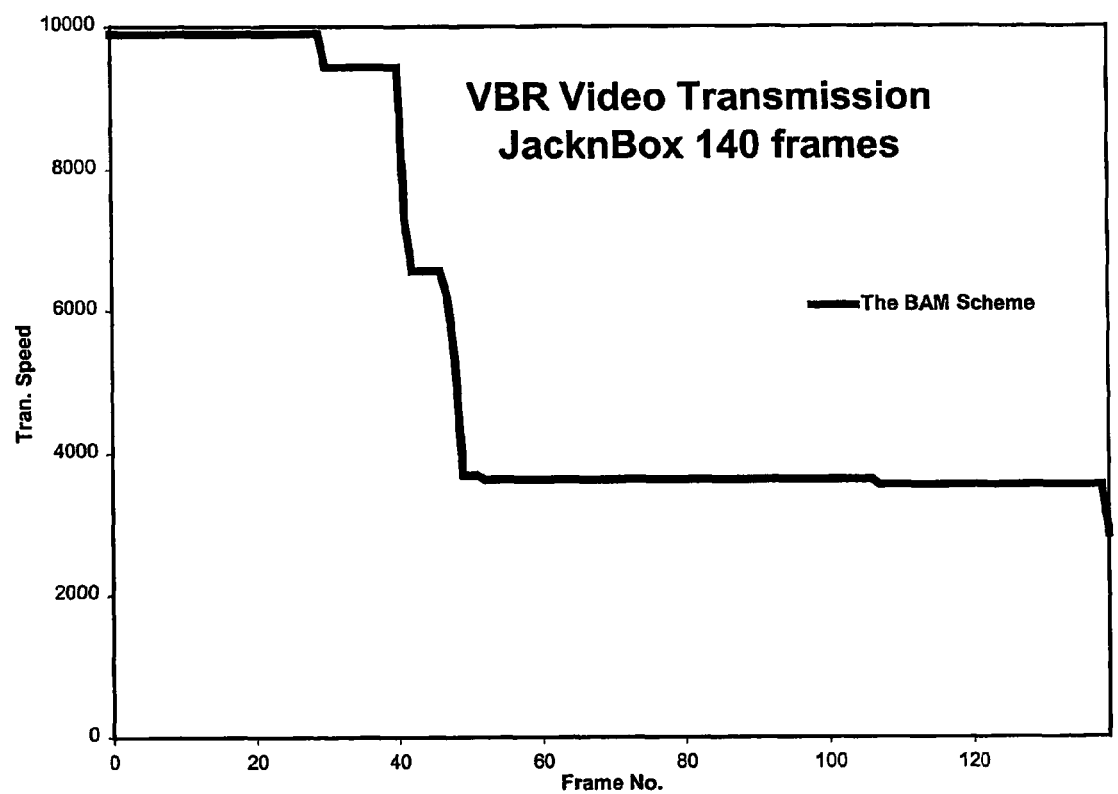
Figure 1C:
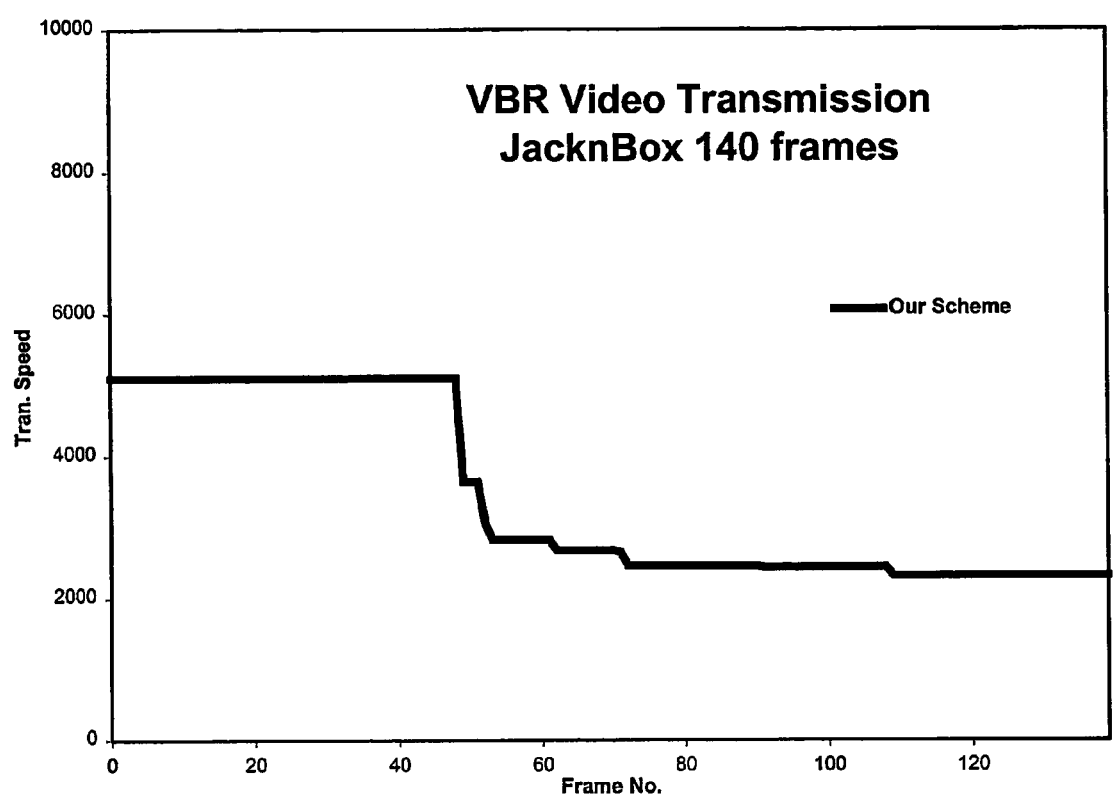

FIG. 1 shows these results plotted graphically.

The analysis results are listed in Table 1:

TABLE 1

| | JacknBox 140 frame, H.263+ | | |
|---|---|---|---|
| Schemes | (c) Fixed bandwidth channel with average bit rate | (a) Our scheme | (b) Furini & Towsley |
| Bandwidth utilization (%) | 100 | 100 | 63.46 |
| The Start Reservation Rate (bits/per frame interval) | 3,669 | 5,100 | 39,824 |
| LOS(frames) | 108488/3669 = 29.57 | 39824/5100 = 7.8 | 39824/39824 = 1 |
| Buffer Size(bits) | 108,488 | 60,336 | 39,824 |

We have also encoded the same video sequence with a CBR rate control. In this case, the LOS would be 29656/3735=7.94 frames. However, 10 frames are skipped with the normal CBR rate control and the bits budget we give is the same as the average number of bits in VBR encoding.

Example 2

8400 Frames' TV Programme Using H.263+

This test used a normal TV programme QCIF (quarter-CIF) sequence with 8400 frames, coded with a fixed Quantiser step size of 16 using H.263+. The picture type is IPPPP . . . with forced updating every 132 frames in the H.263+ recommendation.

(a) f(t)=

| | |
|---|---|
| 4977 | $T_0 < t <= T_{3173}$; |
| 4218 | $T_{3173} < t <= T_{3679}$; |
| 3968 | $T_{3679} < t <= T_{3680}$; |
| 3848 | $T_{3680} < t <= T_{3681}$; |
| 3844 | $T_{3681} < t <= T_{4752}$; |
| 3090 | $T_{4752} < t <= T_{8392}$; |
| 992 | $T_{8392} < t <= T_{8393}$; |
| 816 | $T_{8393} < t <= T_{8394}$; |
| 644 | $T_{8394} < t <= T_{8396}$; |
| 544 | $T_{8396} < t <= T_{8397}$; |
| 384 | $t > T_{8397}$; |

$b_0$=13944 bits;

As previously, $b_0$ may be achieved by the first rate of 4977 bits per frame interval.

(b) f(x)=

| | |
|---|---|
| 27672 | $T_0 < t <= T_{8339}$; |
| 26704 | $T_{8339} < t <= T_{8340}$; |
| 26560 | $T_{8340} < t <= T_{8341}$; |
| 26488 | $T_{8341} < t <= T_{8342}$; |
| 26240 | $T_{8342} < t <= T_{8344}$; |
| 25832 | $T_{8344} < t <= T_{8345}$; |
| 25136 | $T_{8345} < t <= T_{8346}$; |
| 24168 | $T_{8346} < t <= T_{8347}$; |
| 23816 | $T_{8347} < t <= T_{8352}$; |
| 23760 | $T_{8352} < t <= T_{8353}$; |
| 23616 | $T_{8353} < t <= T_{8356}$; |
| 22824 | $T_{8356} < t <= T_{8357}$; |
| 22528 | $T_{8357} < t <= T_{8358}$; |
| 21952 | $T_{8358} < t <= T_{8359}$; |
| 21744 | $T_{8359} < t <= T_{8369}$; |
| 20448 | $T_{8369} < t <= T_{8373}$; |
| 20344 | $T_{8373} < t <= T_{8384}$; |
| 19960 | $T_{8384} < t <= T_{8385}$; |
| 19016 | $T_{8385} < t <= T_{8391}$; |
| 11656 | $T_{8391} < t <= T_{8392}$; |
| 992 | $T_{8392} < t <= T_{8393}$; |
| 816 | $T_{8393} < t <= T_{8394}$; |
| 648 | $T_{8394} < t <= T_{8396}$; |
| 544 | $T_{8396} < t <= T_{8397}$; |
| 384 | $T_{8397} < t <= T_{8399}$. |

$b_0$=13944 bits;

$b_0$ may be transmitted at 29762 bits per frame interval.

(c) With a constant average bit rate, FOT would be:
f(t)=3966.
$b_0$=3348584 bits;
$b_0$ may be set at 3669 bits per frame interval.

Figure 2A:
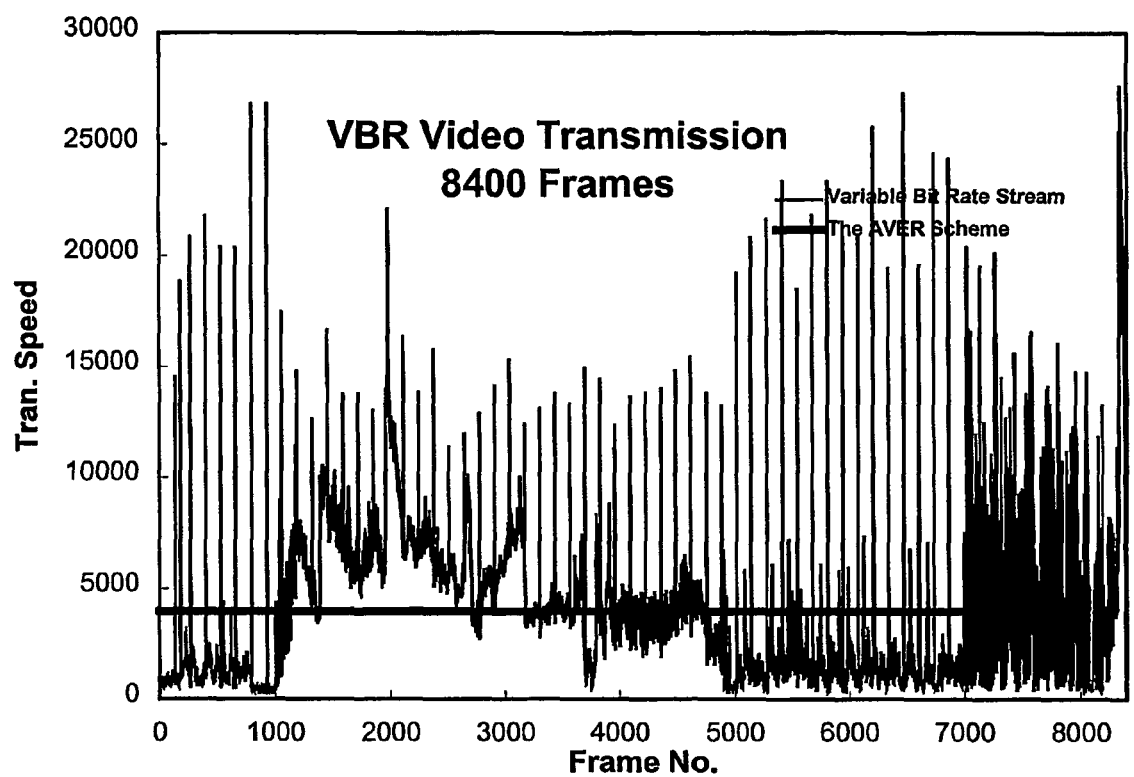
Figure 2B:
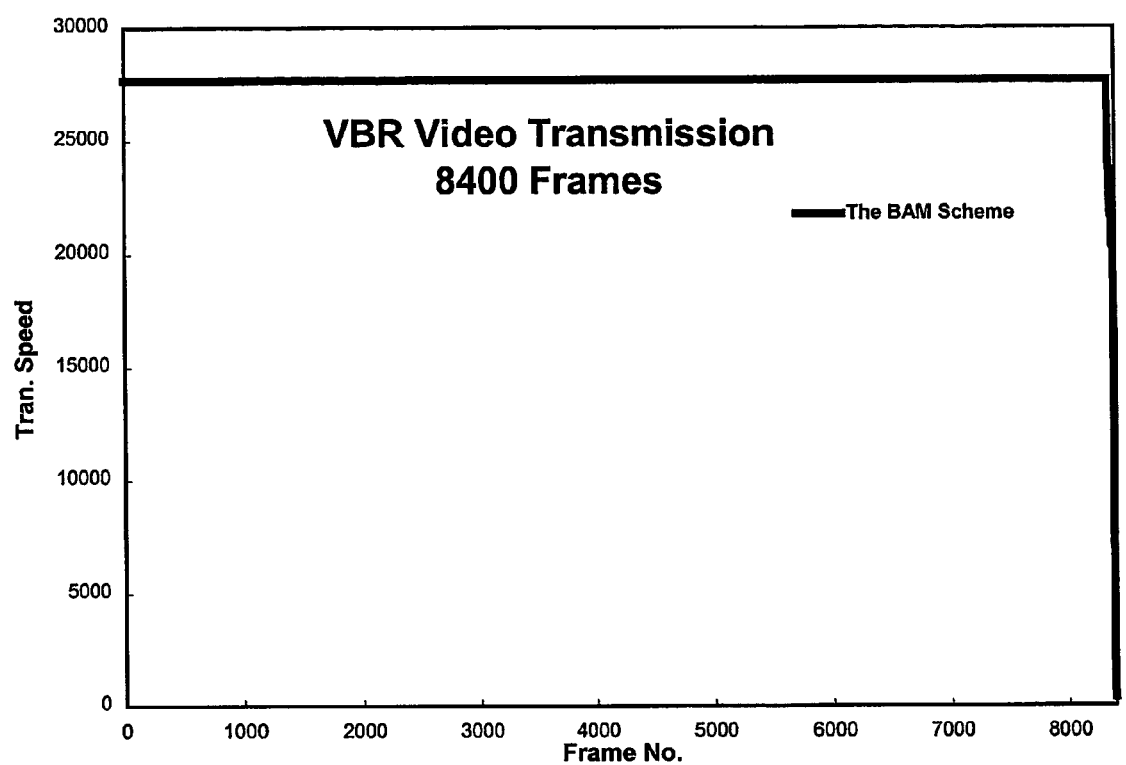
Figure 2C:
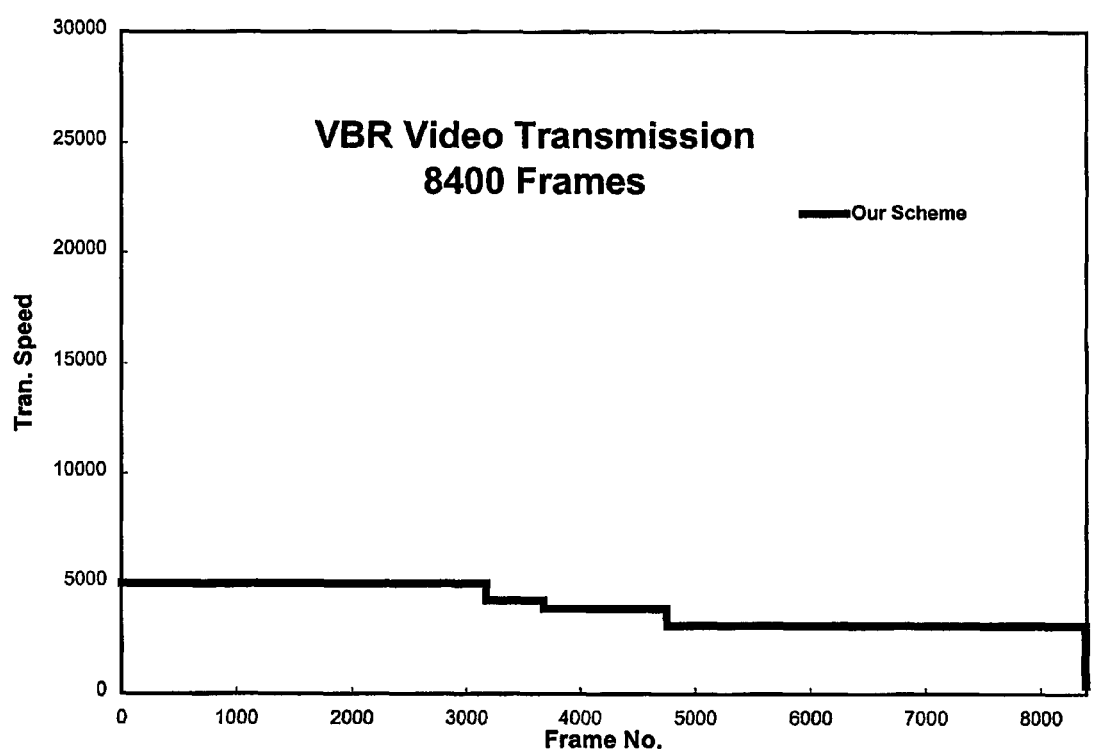

FIG. 2 shows these FOT curves for 8400 frames' TV programme with H.263+.

The analysis results are listed in Table 2:

TABLE 2

| | 8400 frames H.263+ | | |
|---|---|---|---|
| Schemes | (c) Fixed bandwidth channel with average bit rate | (a) Our scheme | (b) Furini & Towsley |
| Bandwidth utilization (%) | 100 | 100 | 14.36 |
| The Start Reservation Rate (bits/per frame interval) | 3,966 | 4,977 | 27,672 |
| LOS (frame interval) | 3348584/3966 = 844.322 | 13944/4977 = 2.8 | 13944/27672 = 0.5 |
| Buffer Size (bits) | 6,116,362 | 3,908,218 | 27,672 |

Example 3

8400 Frames' TV QCIF Programme Coded with MPEG4

The same TV programme QCIF sequence of 8400 frames was coded using MPEG4, with a fixed Quantiser step size of 10. The picture type is IBBPBBPBBPBB (N=12, M=3). It should be noted that, with B pictures, the encoding sequence of pictures is different from the displaying sequence of pictures. So the related I or P pictures must be transmitted prior to the B picture.

Some pre-processing is needed before using our algorithm.
(a) Finally, our FOT is:
f(t)=

| | |
|---|---|
| 7426 | $T_0 < t <= T_{4750}$; |
| 6938 | $T_{4750} < t <= T_{4786}$; |
| 66470 | $T_{4786} < t <= T_{4798}$; |
| 6309 | $T_{4798} < t <= T_{4870}$; |
| 6190 | $T_{4870} < t <= T_{4900}$; |
| 6083 | $T_{4900} < t <= T_{4918}$; |
| 6026 | $T_{4918} < t <= T_{8398}$; |
| 168 | $T_{8398} < t$. |

$b_0$=16548 bits;
$b_0$ can be sent using 7426 bits per frame interval.
(b) f(x)=

| | |
|---|---|
| 57472 | $T_0 < t <= T_{8338}$; |
| 50616 | $T_{8338} < t <= T_{8350}$; |
| 49504 | $T_{8350} < t <= T_{8368}$; |
| 48608 | $T_{8368} < t <= T_{8371}$; |
| 48536 | $T_{8371} < t <= T_{8383}$; |
| 44968 | $T_{8383} < t <= T_{8386}$; |
| 31752 | $T_{8386} < t <= T_{8389}$; |
| 28696 | $T_{8389} < t <= T_{8398}$; |
| 168 | $T_{8398} < t$. |

$b_0$=16040 bits;
$b_0$ may be set at 57472 bits per frame interval.
(c) With a constant average bit rate, FOT would be:
f(x)=6825.

$b_0$=2874758 bits;

$b_0$ may be set at 6825 bits per frame interval.

Figure 3A:
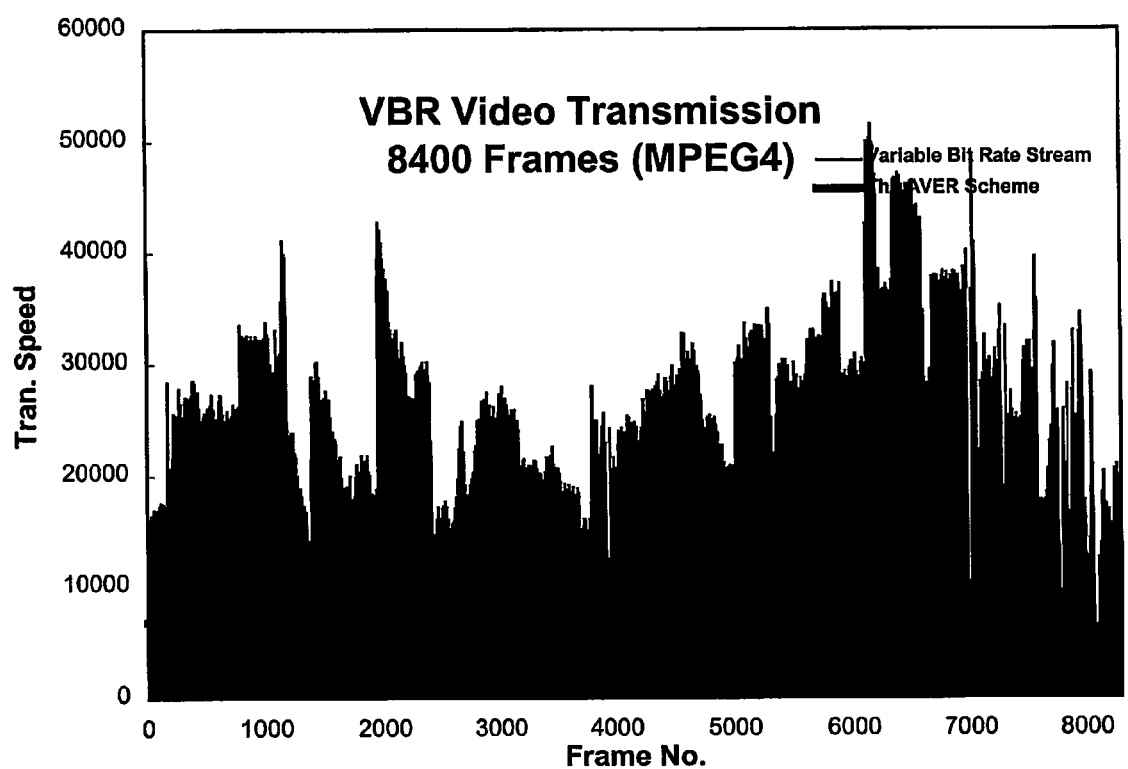
Figure 3B:
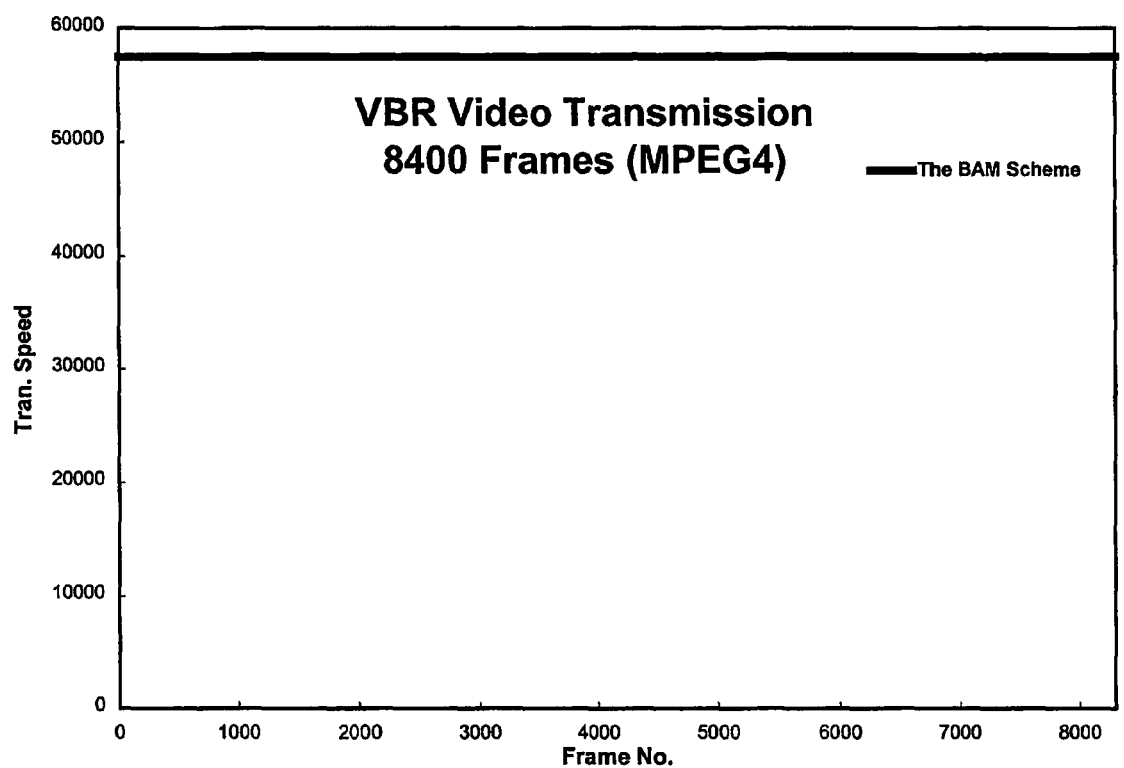
Figure 3C:
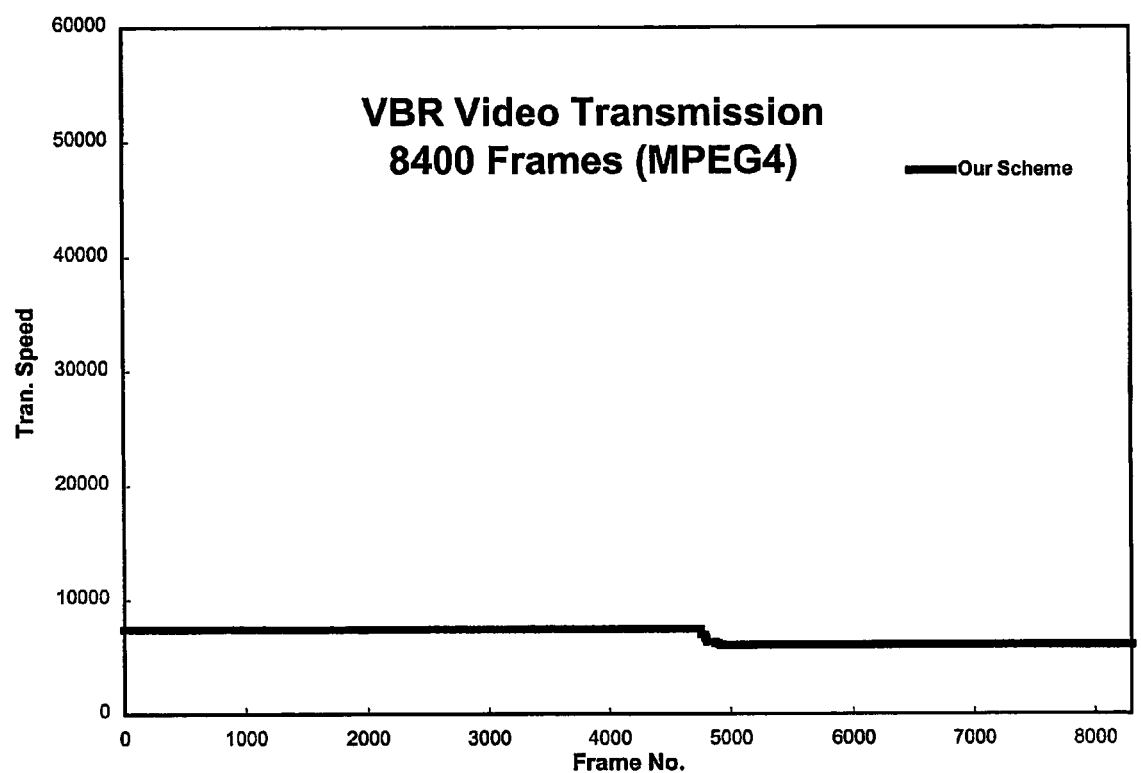

FIG. 3 shows these FOT curves for 8400 frames' TV programme with MPEG4 (N=12, M=3).

The analysis results are listed in Table 3:

TABLE 3

| | 8400 frames, MPEG4 | | |
|---|---|---|---|
| Schemes | (c) Fixed bandwidth channel with average bit rate | (a) Our scheme | (b) Furini & Towsley |
| Bandwidth utilization (%) | 100 | 100 | 11.897 |
| The Start Reservation Rate (bits/per frame interval) | 6,825 | 7,426 | 57,472 |
| LOS (frames) | 2874758/6825 = 421.21 | 16548/7426 = 2.228 | 16040/57472 = 0.279 |
| Buffer Size (bits) | 6,236,252 | 3,997,072 | 57,472 |

From the above experimental results, it can be seen that LOS has been greatly reduced while we still keep 100% transmission efficiency. No network resource has been wasted. The only thing still can be further improved is to further minimise the required buffer size at the decoder.

Figure 4:
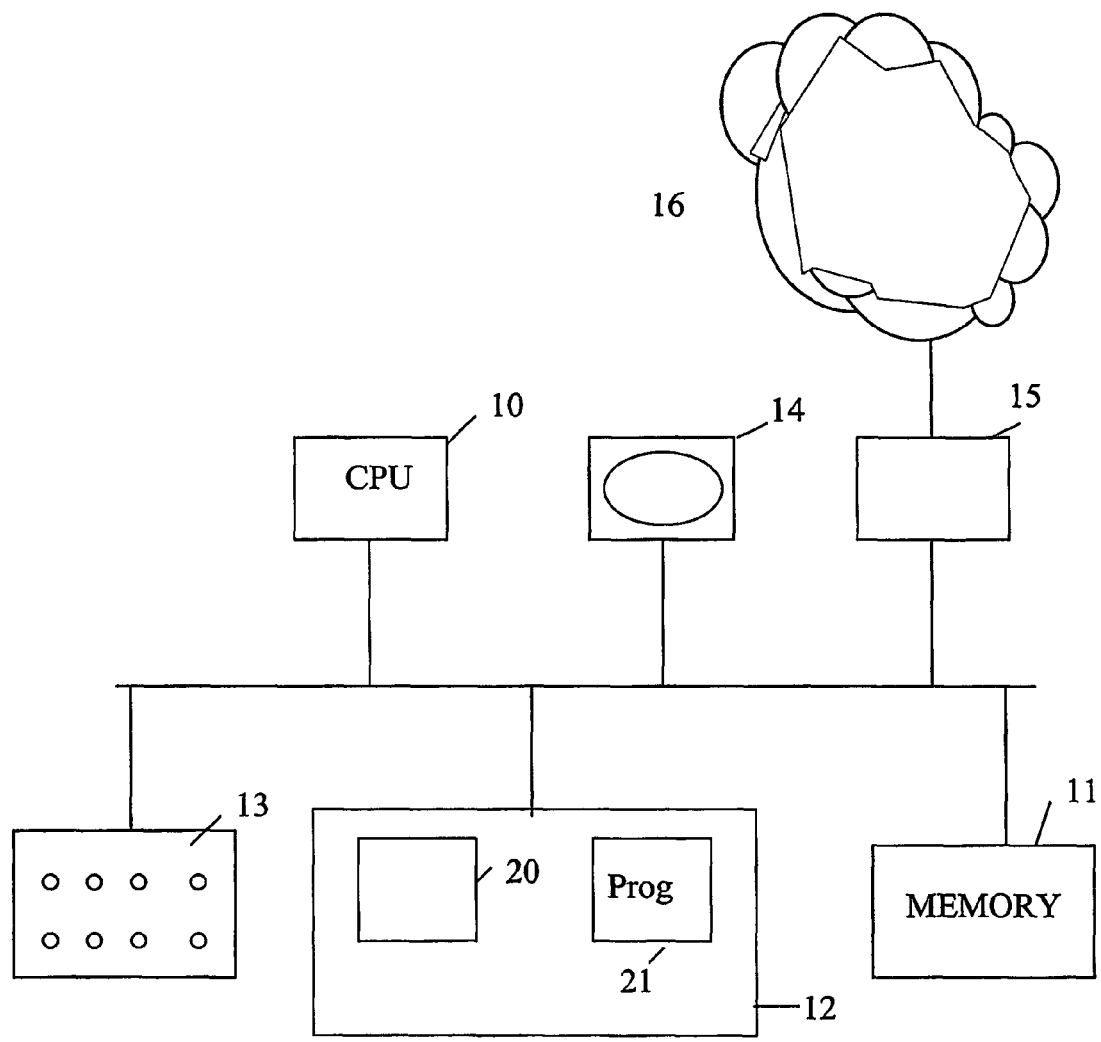
FIG. 4 is a block diagram of one form of apparatus for implementing the invention.

FIG. 4 is a block diagram of a server operable in accordance with the invention. It contains the usual computer components, that is a processor 10, memory 11, a disc store 12, keyboard 13, a display 14, and a network interface 15 for connection to a telecommunications network 16. Video sequences available to be transmitted are stored in the disc store 12 in a conventional manner in the form of encoded files 20.

Figure 5:
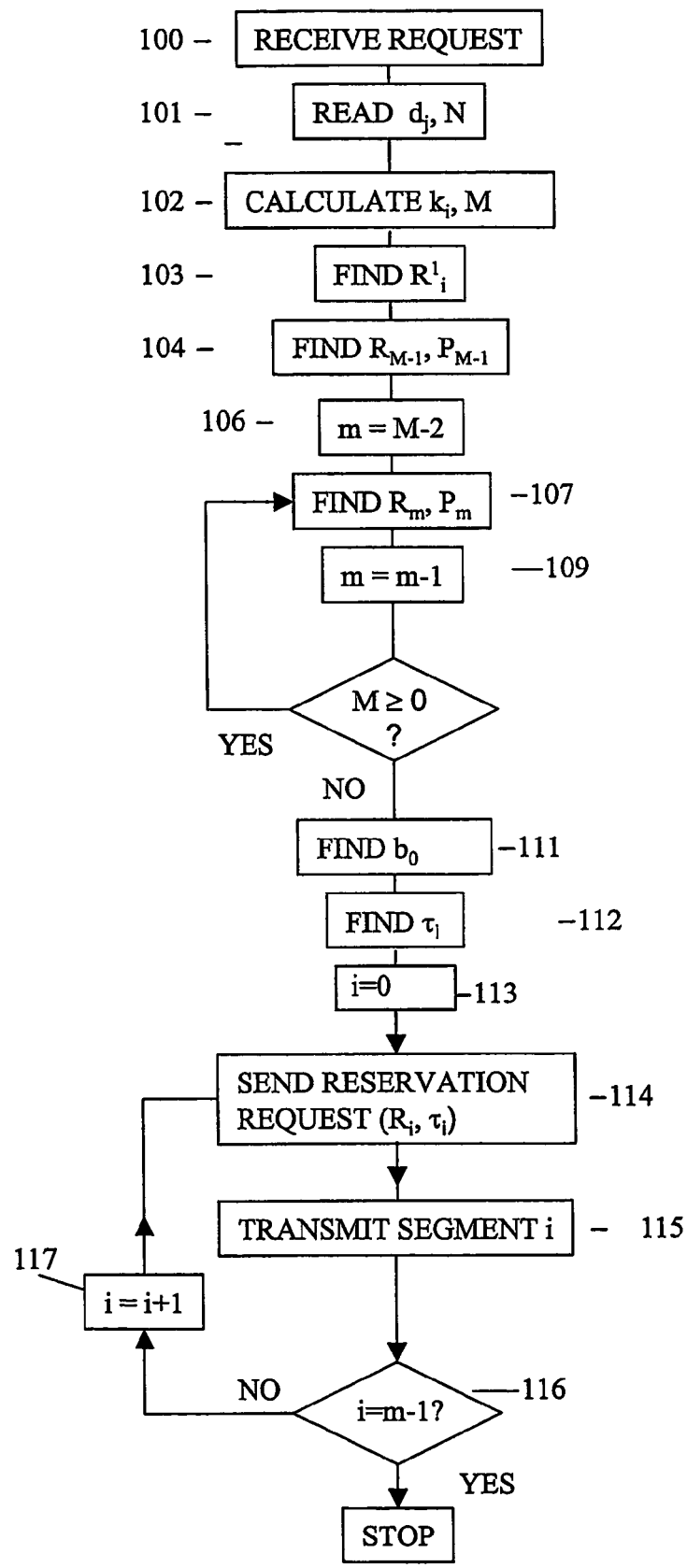
FIG. 5 is a flowchart illustrating the operation of the apparatus of FIG. 4.

Also stored in the disc store 12 is a computer program 21 for implementing controlling the operation of the server. The operation of this program, using the "floor" method, will now be described with reference to the flowchart shown in FIG. 5.

Step 100

A request is received via the interface 15 from a remote terminal for transmission of a desired video sequence; such a request includes the filename of that one of the files 20 containing that sequence.

Step 101

The processor 10 reads the file in question from the disc store 12 and determines the number of coded bits $d_j$ in the file for each of the N frames in the stored sequence, and stores the value of N and $d_j$ (j=0 ... N−1) in the memory 11.

Step 102

The processor calculates $k_0 ... k_{M-1}$ as described above and stores M and $k_0 ... k_{M-1}$ in the memory 11.

Step 103 Calculate $R^1_i$=for all i

Step 104 Set $R_{M-1} = {}_Q\{R^1_{M-1}\}$ and Compute $P_{M-1}$

Step 106 Set a pointer m=M−2

Step 107 Compute $R_m$ and $P_m$

Step 109 Decrement m. If m≧0, go to step 107

Step 111 Compute $b_0 = P_0 + R_0$

Step 112 Compute the segment durations—in this implementation the preload and segment 0 are regarded as a single segment for transmission purposes. Thus $$\tau_0 = (b_0/R_0 + k_0 + 1)*\tau$$

$$\tau_i = (k_i - k_{i-1})*\tau \quad i=1 \ldots M-1$$

where τ is the length of a frame period.

Step 113 Set i to 0

Step 114 Transmit a reservation request specifying a rate of $R_i$ and a duration of at least $\tau_i$.

Step 115 Transmit Segment i at rate $R_i$ (preceded, when i=0, by $P_0$ preload bits).

Step 116. If all segments have been transmitted, stop; otherwise, increment i at 117 and go to step 114.

Some reservation systems, such as the RSVP system mentioned earlier, in order to accommodate multicasting, require that a reservation request be issued by the receiving terminal. In such a case step 113 would be modified to specify the transmission of a message to the receiving terminal specifying $R_i$ and $\tau_i$. Whereupon the terminal would transmit the required reservation request to the network.

In some networks, it may be that there is some constraint on the times at which the reserved rate may be changed. However the approach adopted above is robust to such problems because every reservation request except the first requests a lower rate than before. It follows that delay in processing such requests results in the reserved rate remaining high after the actual transmitting rate has been reduced. In this case the efficiency of network utilisation falls, but the transmission quality is unaffected.

The reservation algorithm described above is built upon the constraint that the reserved bit rate must never be increased. This is not however essential, so a second embodiment of the invention which is not subject to this constraint will now be described.

In the case, each segment is chosen in such a manner that, as before, the average generated bit rate $\Sigma d_j$ for the segment is greater than or equal to the average for any shorter part of the video sequence beginning at the start of that segment, but, now, may be less than the average for some longer part starting at the same point.

The procedure will be described for the general segment q (=0 ... M−1)

Using $$A_i^{(q)} = \frac{\sum_{j=k_{q-1}+1}^{i} d_j}{i - k_{q-1}}$$

calculate $A_i^{(q)}$ for all $k_{q-1}+1 \leq i \leq k_{q-1}+H$ (or $k_{q-1}+1 \leq i \leq N-1$ if this is shorter)

where H is some defined maximum length that is to be permitted.

Find the value of i for which $A_i^{(q)}$ is largest, and set $k_q$ equal to this value of i.

This is the same as the previously described procedure, except that the search for the maximum average rate is restricted in its range.

Once $k_q$ (q=0, ..., M−1) have been determined, the actual transmission rates can be determined exactly as described above except that any limits defined to prevent a rate from exceeding that of the preceding segment, or from falling below that of the following one, are omitted.

A second embodiment of the invention explores the possibility of video rate switching. Here, two (or more) video streams are generated, with different picture qualities and hence different data rates. Typically, these may be generated by using different coarsenesses of quantisation—i.e. the low-quality, low data rate stream uses a coarse quantiser and a higher-quality stream, having a higher data rate, uses a less coarse quantiser.

The possibility of video rate-switching is of particular interest in the present context where perhaps rate reservation failure occurs at the beginning of a transmission, and the situation can be remedied by firstly sending a relatively poor quality stream, and later switching to a higher quality stream when the nature of the signal and/or network conditions allow it. However, the system to be described is also useful where video rate-switching is used for some other reason.

When inter-frame coding is in use, switching between two different streams can cause serious corruption of the picture due to mistracking of predictors at the coder and decoder: however, switching may be accommodated without such degradation of picture quality by generating, from time to time, transitional coded frames which essentially code up the difference between a frame of the stream that is to be switched to and a frame of the stream that is to be switched from. So transmission of frames from a first stream is followed by one of more transitional frames and then by frames from the second stream. The generation of such transitional frames is not new and will not be described further. For a descriptions of such a system, see our international patent application WO 98/26604 (and corresponding U.S. Pat. No. 6,002,440). Another such system, using so-called "SP-frames" is described in Marta Karczewicz and Ragip Kurceren, "A Proposal for SP-frames", document VCEG-L-27, ITU-T Video Coding Experts Group Meeting, Eibsee, Germany, 9-12 Jan. 2001, and Ragip Kurceren and Marta Karczewicz. "SP-frame demonstrations", document VCEG-N42, ITU-T Video Coding Experts Group Meeting, Santa Barbara, Calif., USA, 24-27 Sep. 2001.

In the context of the "FOT" approach described above, the question of switching between two streams presents some questions that need to be addressed. If one considers switching at an arbitrary point in time from a first stream to a second stream, then in general the decoder buffer will contain frames of the first stream, which are not useful for decoding the second stream. Thus, assuming that the decoder is to immediately switch to decoding of the second stream, these frames will be unused and represent wasted transmission capacity. Worse, frames needed for decoding of the second stream will not be present in the buffer. Theoretically this can be accommodated if the FOT for the second stream is recalculated, considering the beginning of the part of the second stream that is actually to be transmitted to be the start of the stream, but in practice this can result in a prohibitively high transmitted data rate requirement if interruption of the displayed pictures is to be avoided.

The problem of wasted bits can be avoided by allowing the decoder to continue to decode the frames of the first stream that remain in the buffer, and during this period the buffer might accumulate some of the frames that are needed for decoding of the second stream (i.e. transitional frame(s) and frames of the second stream) but nevertheless the danger of an excessive transmitted bit-rate requirement remains.

Ideally, bitstream switching should occur as soon as available bandwidth appears. However, owing to the problems just discussed, this is not practical. Also, if transitional frames—which normally are generated only at selected points rather than for every frame—are to be generated then the points (the switching points) at which these are to be provided should preferably be planned in advance.

Based on such considerations, we first consider the possibility of switching at times which coincide with the "edge" of a "step" of the FOT. It is a characteristic of this scheme that, at the "edge" of each "step", the receiver buffer stores no bits, as all transmitted bits have been decoded into pictures. Thus, if one were to switch at the "edge" of the original stream, all transmitted bits would be emptied from the receiver buffer and no bits would be wasted due to the bitstream switching.

Although setting switching points at the "step edges" of the original bit stream may waste no transmitted bits, there would be still a problem if the switching point in the new stream were not at a "step edge". The reason is that if the switching point is not at a "step edge" in the new stream, some pre-accumulated bits for the new stream might have to be transmitted within a very short space of time in order to play video continuously at the receiver. It might lead a much higher rate reservation request, perhaps even higher than the reservation rate that the new stream implies. If the switching point in the new bitstream is at the middle of a "step", the shortage of accumulated bits results in a high rate reservation. Thus, ideally, the switching point in the new video stream should be also at the "step edges".

According to the above analyses, it might seem that the only chance to have the optimum switching points for the two streams is where they have the same "edge points". Otherwise, either bits are wasted or one requires a very high bit rate after bitstream switching. Upon further investigation, fortunately, we have found that, for the FOT curves generated from different quantisers, do have similarly positioned "step edges", even if they are not absolutely the same. The reason is that, in a video sequence, complex pictures must cost more bits than normal ones no matter what quantiser is selected.

We have verified this with some experiments. In the experiment, a 140 CIF Jacknbox video sequence was selected.

Figure 6:
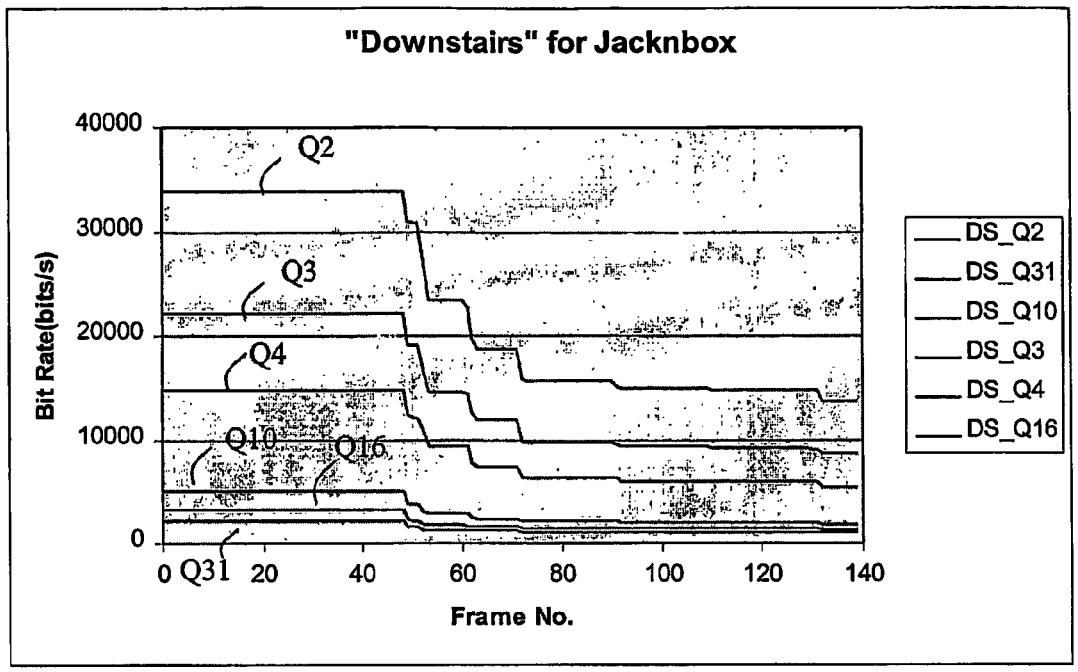
FIGS. 6 to 10 are graphs showing the results of further tests.
Figure 7:
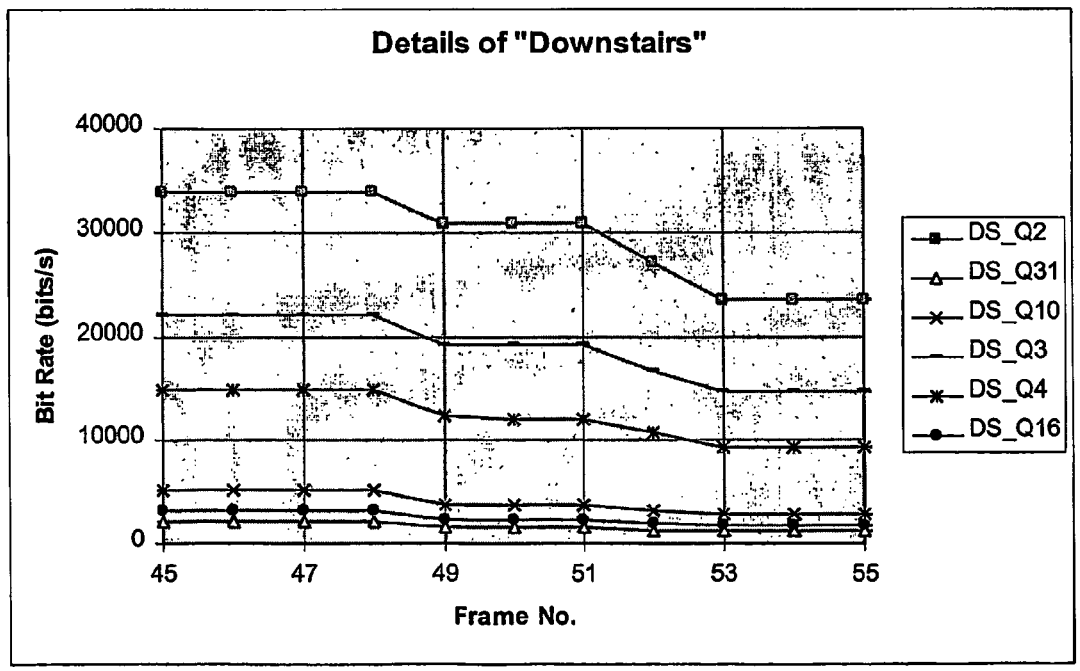
Figure 8:
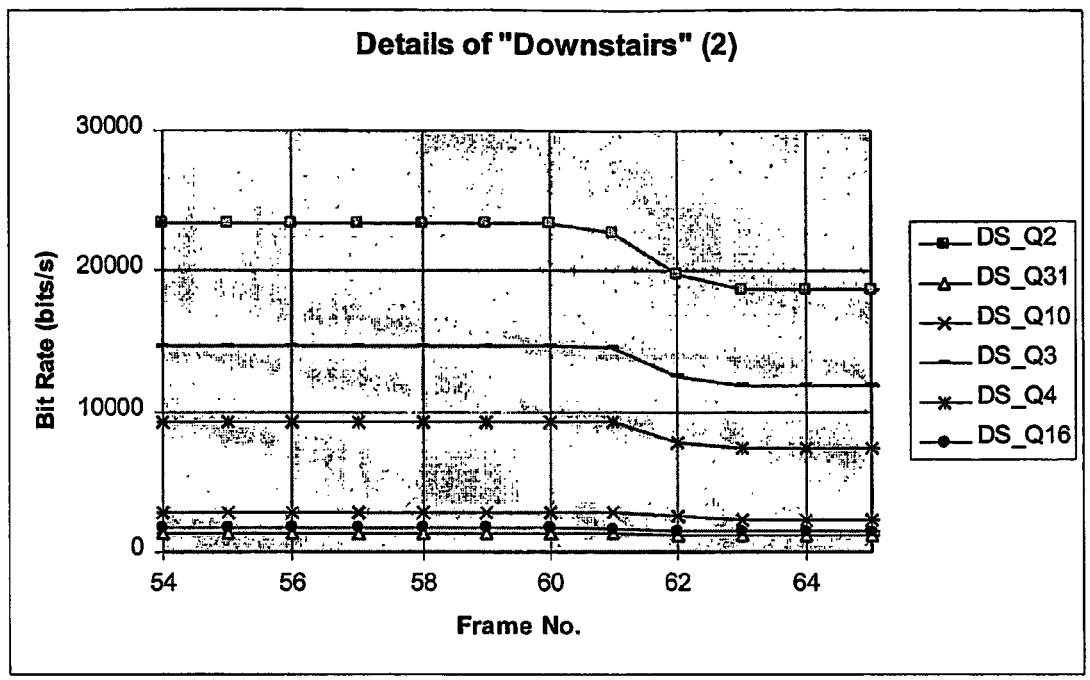

In the first experiment, we wish to clarify whether different video streams based on the same video sequence approach their "step edges" together in their FOT. In FIG. 6, the similarity of FOT curves based on different quantisers is shown. The curves correspond to quantiser step sizes of 2, 3, 4, 10, 16 and 31 and are marked Q2, Q3, etc. It can be seen that with the quantiser step size increasing, the FOT becomes more and more flat. However, they still have the "step edges" almost at the same time. In addition, it should be noticed that, although the "edge" points in different FOTs are similar, they are not the exactly the same. FIGS. 7 and 8 disclose more details of different FOT curves at the "step edges". Although they are not the exactly same, it does little harm to switch bitstream at an approximate place. The following experiment may further verify it.

Figure 9:
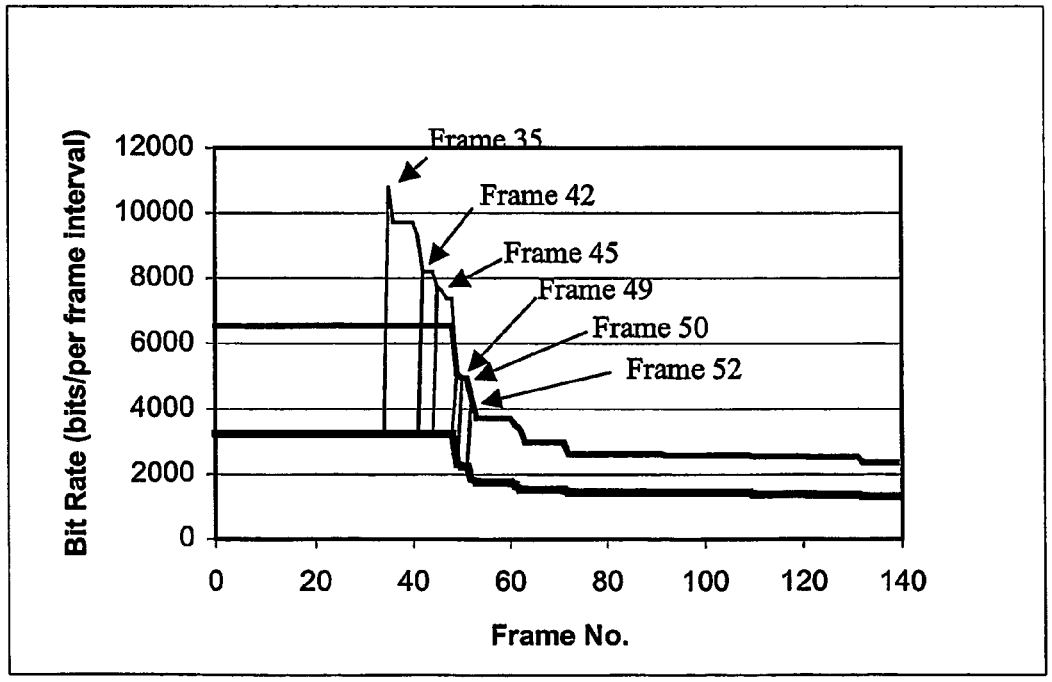
Figure 10:
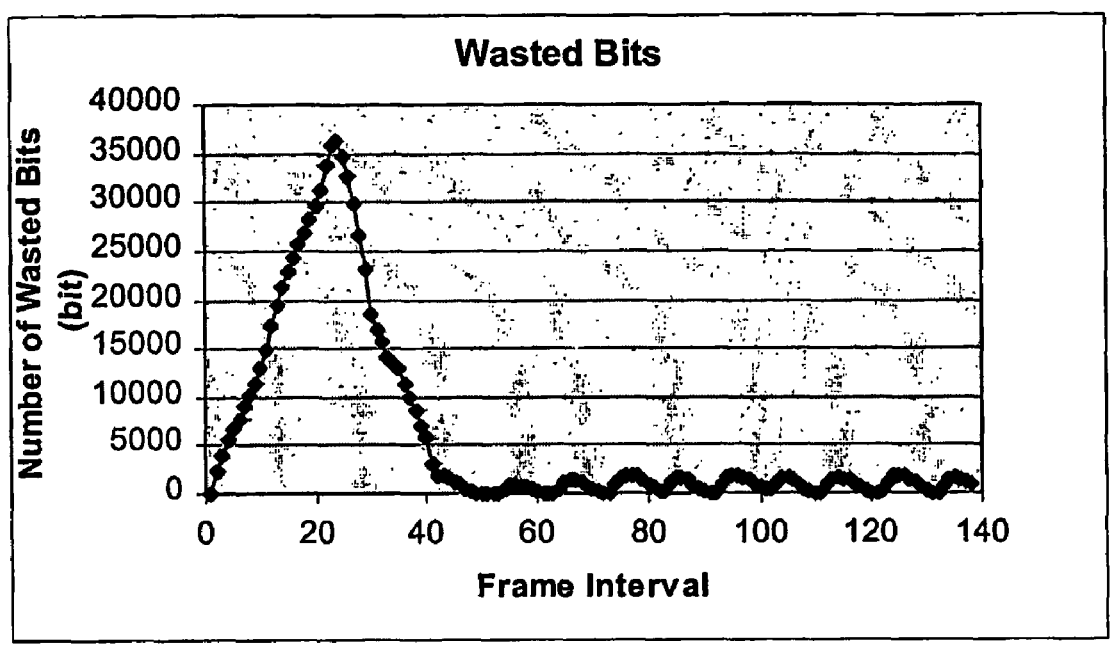

In the second experiment, we suppose that we are to switch the bit stream (Q16 stream) generated with a fixed quantiser 16 to a second bit stream (Q8 stream) generated by a fixed quantiser 8 at each frame interval. In FIG. 9, we show some reservation curves if we respectively switch bitstream at Frame 35, 42, 45, 49, 50 and 52. In FIG. 10, we show the number of wasted bits when the bitstream is switched at different frame intervals. FIGS. 9 and 10 should be sufficient to illustrate the difference between switching streams at the "edge" point or at other points. In FIG. 9, it can be seen that, if the switching points are far from the "step edges", the required transmission rate is even higher than the originally required transmission rate of the Q8 stream. It is just as we analysed earlier. In this situation, one needs to achieve the necessary bit accumulation within a short time in order to realise the proper display after bitstream switching. Thus, the required transmission rate might be very high and it becomes unrealistic to complete such bitstream switching. On the other hand, if the bitstream is switched near the "edge" points, there is no requirement for a very high transmission rate to achieve the necessary bit accumulation because each "step" in the FOT is independent. In FIG. 10, it can also be observed that switching the bitstream near the "edge" points is more advisable. In the FOT curve, one always needs to pre-accumulate some bits for the following frames. If bitstream switching is applied, the pre-accumulated bits for the original stream will be of no use. These bits will be wasted.

In FIG. 10, it is easy to see that switching the bit stream only at "step edges" can waste no bits. The nearer it is to "step edges", the fewer bits are wasted. Both from FIG. 9 and FIG. 10, it is verified that the best switching points in FOT are their "step edges".

As for the question of precisely at what point to choose a switching point for switching from a first to a second stream in practice, if the steps of the two streams coincide, there is of course no ambiguity. If however there is a difference in timing, one can:
 a) choose a step in the first stream (with ease of implementation);
 b) choose a step in the second stream (likewise easy to implement);
 c) choose the earlier of the two steps (thereby minimising wasted bits);
 d) choose the later of the two steps (thereby avoiding any increase in reservation bandwidth for the second stream).

However in practice it matters little which option one selects since the differences between them in terms of performance are fairly small: indeed, if the chosen switching point is a few frames offset from the "step", satisfactory performance can often be obtained.

In the light of this, the proposed method proceeds as follows (assuming option (a) above):
 i) Calculate the FOT for the first stream;
 ii) Choose a switching point to coincide with a step of this FOT;
 iii) Generate a transition frame;
 iv) Calculate the FOT for the transition frame plus the remainder of the second stream;
 v) Transmit the first stream up to the switching point;
 vi) Transmit the transition frame plus the remainder of the second stream.

In the event that option (b), (c) or (d) is used, then step i) would involve calculation of the FOT of the second stream too, and step (ii) would involve selection according to the option chose. Nevertheless, the FOT for the second stream still has to be recalculated in step 4. Note also that the (re)calculation at step (iv) will automatically take into account any corrections necessary due to non-coincidence of the switching point with the step originally calculated for the second stream, and/or due to the use of the "ceiling" or "floor" rates as discussed earlier.

Of course, more than one switching point may be chosen, if desired, for example to revert to the first stream, or to switch to a third stream.

Although the switching issues have been discussed in the context of systems that are constrained to have a monotonically decreasing FOT, this approach may also be used where this constraint is not applied. Equally, it is also useful when switching from a high-quality stream to a low-quality stream.

The invention claimed is:

1. An automated machine implemented method of transmitting over a communications network a digital data sequence of video signals which have been encoded using a compression algorithm such that the number of coded bits per frame is not constant, comprising using a programmed processor to:
 (a) partition the data sequence into segments;
 (b) determine a transmission bit rate for each segment over said communication network; and
 (c) transmit the sequence of video signals at a plurality of the determined transmission bit rates,
 wherein the sequence is partitioned into segments such that the first segment is that portion at the beginning of the sequence which has an average number of coded bits per frame which is greater than or equal to the average number of coded bits per frame of any possible shorter portion starting at the beginning of the sequence, and
 wherein each succeeding segment is a portion immediately following the preceding segment which has an average number of coded bits per frame which is greater than or equal to the average number of coded bits per frame of any possible shorter portion immediately following the preceding segment.

2. An automated machine-implemented method of transmitting a digital sequence of video signals which have been encoded using a compression algorithm such that the number of coded bits per frame is not constant, wherein the source video had been coded into a first sequence and a second sequence having respective different compression rates, said method comprising using a programmed processor to:
 (a) analyze at least one of the streams to divide it into segments;
 (b) select a switching point in the vicinity of an intersegment transition identified at step (a);
 (c) if the first sequence was not analyzed in step (a), analyzed the first sequence to divide it into segments;
 (d) determine a bit rate for the or each segment of the first sequence up to the switching point;
 (e) transmit the signal of the first sequence up to the switching point at the determined bit rate(s);
 (f) analyze a modified sequence which includes the second sequence from the switching point onwards, to divide it into segments;
 (g) determine a bit rate for segments of the modified sequence; and
 (h) transmit the signals of the modified sequence at the determined bit rate(s);
 wherein said analyses are each performed by dividing the relevant sequence into segments, wherein the first segment is a portion at the beginning of the sequence which has an average number of coded bits per frame which is greater than or equal to the average number of coded bits per frame of any shorter such portion, and wherein each succeeding segment is a portion immediately following the preceding segment which has an average number of coded bits per frame which is greater than or equal to the average number of coded bits per frame of any shorter such portion.

3. A method according to claim 2 in which, in step (b), the switching point is selected to be in the vicinity of an intersegment transition of the first sequence.

4. A method according to claim 2 in which, in step (b), the switching point is selected to be in the vicinity of an intersegment transition of the second sequence.

5. A method according to claim 2 in which, in step (a), both the first and the second sequence are analyzed, and in step (b), the switching point is selected to be in the vicinity of intersegment transitions of both the first and second sequences, or in the event that the transitions do not coincide, in the vicinity of the earlier of the two transitions.

6. A method according to claim 2 in which, in step (a), both the first and the second sequence are analyzed, and in step (b), the switching point is selected to be in the vicinity of intersegment transitions of both the first and second sequences, or in the event that the transitions do not coincide, in the vicinity of the later of the two transitions.

7. A method according to claim 2 in which the switching point is selected to occur within four frames of the relevant transition.

8. A method according to claim 7 in which the switching point is selected to coincide with the relevant transition.

9. A method according to claim 2 in which the first sequence is encoded at a higher compression rate than the second sequence.

10. A method according to claim 9 in which the first sequence is encoded using a coarser quantization than the second sequence.

11. A method according to claim 2 in which the sequences are encoded using inter-frame coding, and including generating at the switching point a transitional sequence consisting of or commencing with a frame of the second sequence encoded using a decoded frame of the first sequence as predictor, and in which the modified sequence comprises the transition sequence followed by frames of the second sequence.

12. A method according to claim 1 wherein the first segment of the or a sequence is that portion at the beginning of the sequence which has an average number of coded bits per frame which is greater than or equal to the average number of coded bits per frame of any possible such portion not exceeding a maximum predetermined length, and wherein each succeeding segment is that portion immediately following the preceding segment which has an average number of coded bits per frame which is greater than or equal to the average number of coded bits per frame of any possible such portion not exceeding said maximum predetermined length.

13. A method according to claim 1 in which the bit rate determined for each of at least the later segments of the or a sequence is a number of bits per frame period equal to the average coded bits per frame for that segment.

14. A method according to claim 1 in which the bit rate determined for each of at least the later segments of the or a sequence is a number of bits per frame period equal to the lowest one of a set of permitted bit rates that is greater than or equal to a nominal rate for that segment, said nominal rate being the average coded bits per frame for that segment less any reduction permitted as a consequence of the determined bit rate for the preceding sequence being in excess of the nominal rate for that preceding segment.

15. A method according to claim 1 in which the bit rate determined for each of at least the later segments of the or a sequence is a number of bits per frame period equal to the highest one of a set of permitted bit rates that is less than or equal to a nominal rate for that segment, said nominal rate being the average coded bits per frame for that segment plus any increase necessitated as a consequence of the determined bit rate for the following sequence being less than the nominal rate for that preceding segment.

16. An automated machine-implemented method of transmitting a digital sequence of video signals which have been encoded using a compression algorithm such that the number of coded bits per frame is not constant, comprising using a programmed processor to:

(a) divide the sequence into segments, wherein the first segment is a portion at the beginning of the sequence which has an average number of coded bits per frame which is greater than or equal to the average number of coded bits per frame of any shorter such portion, and wherein each succeeding segment is a portion immediately following the preceding segment which has an average number of coded bits per frame which is greater than or equal to the average number of coded bits per frame of any shorter such portion;

(b) determine a bit rate for each segment;

(c) transmit the signals at the determined bit rates wherein the first segment of the or a sequence is that portion at the beginning of the sequence which has an average number of coded bits per frame which is greater than or equal to the average number of coded bits per frame of any possible such portion, and wherein each succeeding segment is that portion immediately following the preceding segment which has an average number of coded bits per frame which is greater than or equal to the average number of coded bits per frame of any possible such portion in which the bit rate determined for each of at least the later segments of the or a sequence is a number of bits per frame period equal to the larger of:

(i) the lowest one of a set of permitted bit rates that is greater than or equal to a nominal rate for that segment, said nominal rate being the average coded bits per frame for that segment less any reduction permitted as a consequence of the determined bit rate for the preceding sequence being in excess of the nominal rate for that preceding segment; and (ii) the lowest one of the set of permitted bit rates that is greater than or equal to the average coded bits per frame for the following segment.

17. An automated machine-implemented method of transmitting a digital sequence of video signals which have been encoded using a compression algorithm such that the number of coded bits per frame is not constant, comprising using a programmed processor to:

(a) divide the sequence into segments, wherein the first segment is a portion at the beginning of the sequence which has an average number of coded bits per frame which is greater than or equal to the average number of coded bits per frame of any shorter such portion, and wherein each succeeding segment is a portion immediately following the preceding segment which has an average number of coded bits per frame which is greater than or equal to the average number of coded bits per frame of any shorter such portion;

(b) determine a bit rate for each segment;

(c) transmit the signals at the determined bit rates wherein the first segment of the or a sequence is that portion at the beginning of the sequence which has an average number of coded bits per frame which is greater than or equal to the average number of coded bits per frame of any possible such portion, and wherein each succeeding segment is that portion immediately following the preceding segment which has an average number of coded bits per frame which is greater than or equal to the average number of coded bits per frame of any possible such portion;

in which the bit rate determined for each of at least the later segments of the or a sequence is a number of bits per frame period equal to the lower of:

(i) the highest one of a set of permitted bit rates that is less than or equal to a nominal rate for that segment, said nominal rate being the average coded bits per frame for that segment plus any increase necessitated as a consequence of the determined bit rate for the following sequence being less than the nominal rate for that preceding segment: and (ii) the highest one of the set of permitted bit rates that is less than or equal to the average coded bits per frame for the preceding segment.

18. A method according to claim 1, including transmitting to a telecommunications network commands requesting reservation of said determined bit rates.

19. A method as claimed in claim 1, wherein the sequence of video signals is transmitted at said plurality of determined transmission rates such that each segment's determined transmission rate is greater than or equal to the average rate at which bits per frame are generated in said segment unless at the end of the segment where the maximum average generated bits per frame occurs.

20. A method as claimed in claim 1, wherein the transmission bit rate (Rm) for each segment over said communications network is not greater than the bit rate for the immediately preceding segment.

21. A method as claimed in claim 1, wherein the average coded bit rate for a respective segment is greater than or equal to the average for any shorter portion of the video sequence beginning at the start of the respective segment and less than the average coded bit rate for some longer portion starting at the same point.

* * * * *